United States Patent
Gopi

(10) Patent No.: US 8,768,274 B2
(45) Date of Patent: *Jul. 1, 2014

(54) CELLULAR PHONE WITH INTEGRATED FM RADIO AND REMOTE LOW NOISE AMPLIFIER

(75) Inventor: Paramesh Gopi, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 1997 days.

This patent is subject to a terminal disclaimer.

(21) Appl. No.: 11/725,397

(22) Filed: Mar. 19, 2007

(65) Prior Publication Data
US 2007/0224956 A1 Sep. 27, 2007

Related U.S. Application Data

(63) Continuation of application No. 11/704,885, filed on Feb. 9, 2007.

(60) Provisional application No. 60/785,116, filed on Mar. 23, 2006.

(51) Int. Cl.
*H04B 1/18* (2006.01)

(52) U.S. Cl.
USPC .......... 455/188.1; 455/427; 455/557

(58) Field of Classification Search
USPC .................................. 455/188.1
See application file for complete search history.

(56) References Cited

U.S. PATENT DOCUMENTS

| | | | |
|---|---|---|---|
| 5,801,643 A * | 9/1998 | Williams et al. | 340/870.02 |
| 5,991,637 A | 11/1999 | Mack, II et al. | |
| 6,134,437 A * | 10/2000 | Karabinis et al. | 455/427 |
| 6,163,711 A * | 12/2000 | Juntunen et al. | 455/557 |
| 6,658,267 B1 * | 12/2003 | Baranowski et al. | 455/556.1 |
| 7,072,686 B1 | 7/2006 | Schrager | |
| 2003/0104842 A1 | 6/2003 | Choi et al. | |

FOREIGN PATENT DOCUMENTS

| | | |
|---|---|---|
| EP | 1 610 546 | 12/2005 |
| WO | WO 01/63780 | 8/2001 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Ajibola Akinyemi

(57) ABSTRACT

A cellular phone comprises a first wireless transceiver that receives radio frequency (RF) signals, which include frequency modulated (FM) signals that have been tuned by a remote device. An FM processing module receives the RF signals, converts the RF signals to baseband signals and generates processed FM signals.

32 Claims, 7 Drawing Sheets

(56) References Cited

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.
IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.
IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 75 pages.
802.11n; IEEE P802.11-04/0889r6; Wireless LANs, TGn Sync Proposal Technical Specification; 131 pages.
IEEE Std 802.16-2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.
IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 24 pages.
Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.
PCT Notification of Transmittal of the International Search Report and the Written Opinion of the International Searching Authority dated Aug. 6, 2007 for Application No. PCT/US2007/007160; 11 pages.

\* cited by examiner

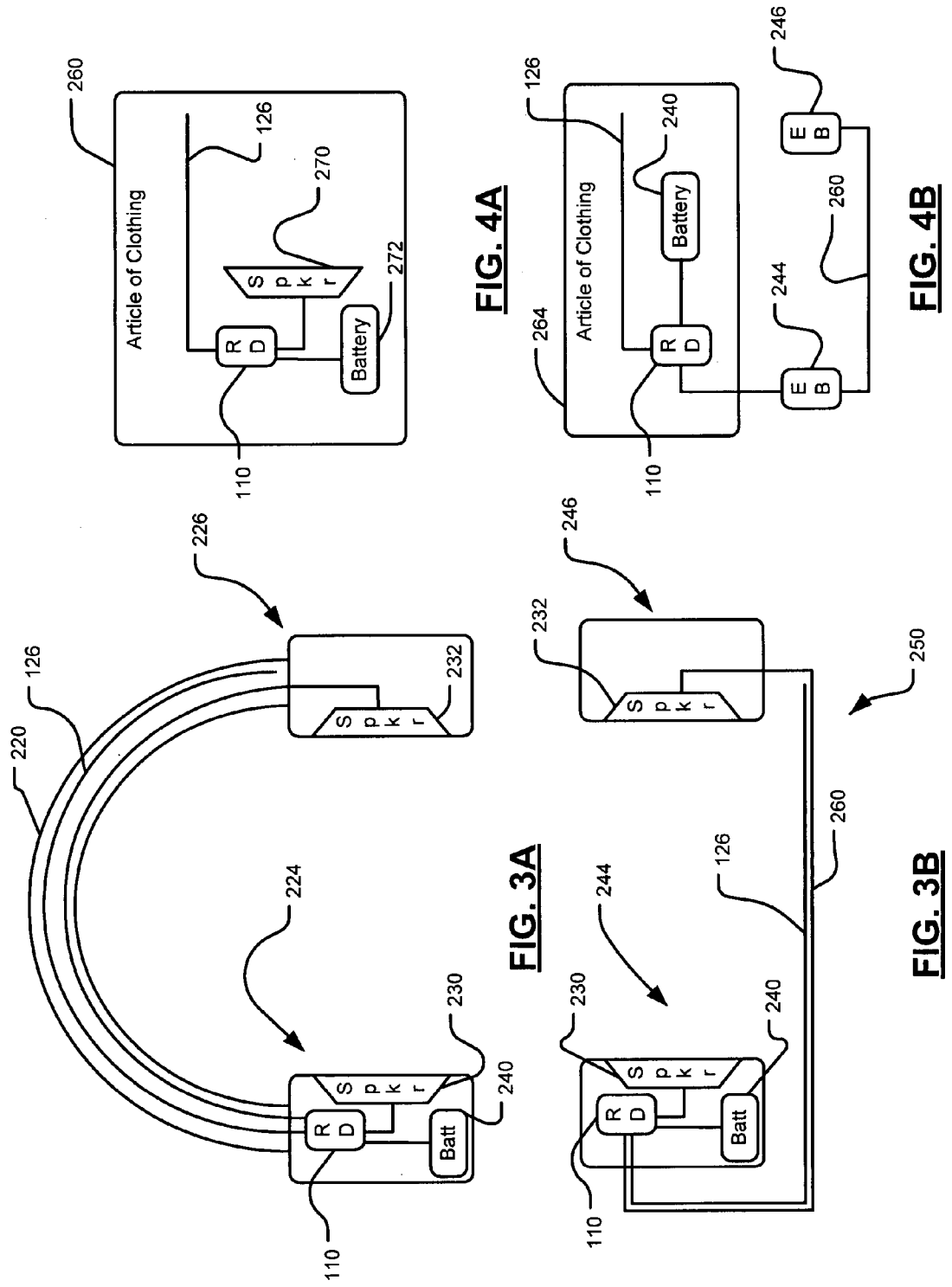

CELLULAR PHONE WITH INTEGRATED FM RADIO AND REMOTE LOW NOISE AMPLIFIER

CROSS-REFERENCE TO RELATED APPLICATIONS

This application is a continuation of U.S. Ser. No. 11/704,885, filed Feb. 9, 2007, which application claims the benefit of U.S. Provisional Application No. 60/785,116, filed on Mar. 23, 2006. The disclosures of the above applications are incorporated herein by reference in their entirety.

FIELD

The present disclosure relates to cellular phones, and more particularly to cellular phones with integrated FM radio receivers.

BACKGROUND

Consumers increasing want to purchase smaller cellular phones. At the same time, consumers also expect their cellular phones to have increased functionality. These two trends may pose problems for cellular phone manufacturers since the demand for increased functionality tends to increase the size of the cellular phones.

Cellular phones may include MP3 players, personal digital assistants (PDAs), WiFi or other network interfaces, cameras, Bluetooth interfaces and/or other devices. Some new cell phones also incorporate FM radio receivers to allow users to receive analog and/or digital FM broadcasts.

Multi-function cellular phones usually require multiple antennas for receiving analog cellular signals, digital cellular signals, Bluetooth signals, WiFi signals and/or other types of wireless signals. If the cellular phone has an FM receiver, another antenna having suitable dimensions is required to allow reception of the FM signals. Because of the compact dimensions of cellular phones, it is not feasible to integrate a suitable FM antenna within the form factor of the cellular phone. Rather, antennas having larger dimensions are typically required and are externally connected to the cellular phone. For example, the antenna may be combined with and/or run adjacent to wires that connect the FM receiver to earphones such as earbuds.

There are multiple ways of implementing an FM receiver. For purposes of illustration, simplified block diagrams of super-heterodyne and direct conversion transmitter and receiver architectures will be discussed, although other architectures may be used. Referring now to FIG. 1A, an exemplary super-heterodyne receiver 14-1 is shown. The receiver 14-1 includes an antenna 19 that is coupled to an optional RF filter 20 and a low noise amplifier 22. An output of the amplifier 22 is coupled to a first input of a mixer 24. A second input of the mixer 24 is connected to an oscillator 25, which provides a reference frequency. The mixer 24 converts radio frequency (RF) signals to intermediate frequency (IF) signals.

An output of the mixer 24 is connected to an optional IF filter 26, which has an output that is coupled to an automatic gain control amplifier (AGCA) 32. An output of the AGCA 32 is coupled to first inputs of mixers 40 and 41. A second input of the mixer 41 is coupled to an oscillator 42, which provides a reference frequency. A second input of the mixer 40 is connected to the oscillator 42 through a −90° phase shifter 43.

The mixers 40 and 41 convert the IF signals to baseband (BB) signals. Outputs of the mixers 40 and 41 are coupled to BB circuits 44-1 and 44-2, respectively. The BB circuits 44-1 and 44-2 may include low pass filters (LPF) 45-1 and 45-2 and gain blocks 46-1 and 46-2, respectively, although other BB circuits may be used. Mixer 40 generates an in-phase (I) signal, which is output to a BB processor 47. The mixer 41 generates a quadrature-phase (Q) signal, which is output to the BB processor 47.

Referring now to FIG. 1B, an exemplary direct conversion receiver 14-2 is shown. The receiver 14-2 includes the antenna 19 that is coupled to the optional RF filter 20 and to the low noise amplifier 22. An output of the low noise amplifier 22 is coupled to first inputs of RF to BB mixers 48 and 50. A second input of the mixer 50 is connected to oscillator 51, which provides a reference frequency. A second input of the mixer 48 is connected to the oscillator 51 through a −90° phase shifter 52. The mixer 48 outputs the I-signal to the BB circuit 44-1, which may include the LPF 45-1 and the gain block 46-1. An output of the BB circuit 44-1 is input to the BB processor 47. Similarly, the mixer 50 outputs the Q signal to the BB circuit 44-2, which may include the LPF 45-2 and the gain block 46-2. An output of the BB circuit 44-2 is output to the BB processor 47.

SUMMARY

In one feature of the present disclosure, a cellular phone is provided that includes a first wireless transceiver that receives intermediate frequency (IF) signals. The IF signals are based on frequency modulated (FM) signals that have been tuned and down-converted from a radio frequency (RF) to an IF by a remote device. An FM processing module receives the IF signals, converts the IF signals to baseband signals, and generates processed FM signals.

In another feature, the cellular phone further includes a cellular phone processing module that performs cellular phone signal processing. One of the first wireless transceiver and the FM processing module is integrated with the cellular phone processing module in an integrated circuit.

In another feature, the first wireless transceiver transmits the processed FM signals to the remote device.

In yet another feature, the cellular phone further includes a user interface that generates FM station selection data. The first wireless transceiver transmits the FM station selection data to the remote device.

In another feature, a system includes the cellular phone and further includes the remote device. The remote device generates an audio signal based on the processed FM signals.

In still another feature, a system includes the cellular phone and further includes the remote device. The remote device further includes an antenna and a tuner. The tuner communicates with the antenna and tunes an RF frequency. In an additional feature, the remote device further includes an amplifier that amplifies RF signals at the RF frequency. In a further feature, the remote device further includes a mixer that mixes the RF signals to generate the IF signals. In another feature, the remote device further comprises a second wireless transceiver that transmits the IF signals to the cellular phone. In another feature, the remote device includes a user interface that communicates with the tuner to select an FM station.

In another feature, the first wireless transceiver and the FM processing module are implemented as an integrated circuit.

In yet another feature, a communication method is provided and includes receiving intermediate frequency (IF) signals via a first wireless transceiver. The IF signals are based on frequency modulated (FM) signals that have been tuned and down-converted from a radio frequency (RF) to an IF by a remote device. The IF signals are received via an FM processing module. The FM processing module converts the IF signals to baseband signals and generates processed FM signals.

In another feature, the communication method includes transmitting the processed FM signals to the remote device.

In still another feature, the communication method further includes generating FM station selection data and transmitting the FM station selection data to the remote device.

In an additional feature, the communication method further includes generating an audio signal based on the processed FM signals.

In another feature, the communication method further includes communicating with an antenna via a tuner. An RF frequency is tuned. In another feature, the communication method further includes amplifying RF signals at the RF frequency. In another feature, the communication method further includes mixing the RF signals to generate the IF signals. In another feature, the communication method includes transmitting the IF signals to a cellular phone.

In another feature, the communication method further includes communicating with a tuner to select an FM station.

In yet another feature, a cellular phone is provided that includes first wireless transceiver means for receiving intermediate frequency (IF) signals, which are based on frequency modulated (FM) signals. The FM signals have been tuned and down-converted from a radio frequency (RF) to an IF by a remote device. FM processing means is included for receiving the IF signals, converts the IF signals to baseband signals, and generates processed FM signals.

In another feature, the cellular phone further includes a cellular phone processing means for performing cellular phone signal processing, at least one of the first wireless transceiver means and the FM processing means is integrated with the cellular phone processing means in an integrated circuit.

In a further feature, the first wireless transceiver means transmits the processed FM signals to the remote device.

In another feature, the cellular phone further includes user interface means for generating FM station selection data, the first wireless transceiver means transmits the FM station selection data to the remote device.

In another feature, a system includes the cellular phone and further includes the remote device, the remote means generates an audio signal based on the processed FM signals.

In still another feature, a system includes the cellular phone and further includes the remote device. The remote device further includes an antenna, and tuner means for communicating with the antenna and tuning an RF frequency. In another feature, the remote device further includes amplifier means for amplifying RF signals at the RF frequency. In an additional feature, the remote device further includes mixer means for mixing the RF signals to generate the IF signals. In another feature, the remote device further includes second wireless transceiver means for transmitting the IF signals to the cellular phone. In another feature, the remote device includes user interface means for communicating with the tuner means to select an FM station.

In another feature, the first wireless transceiver means and the FM processing means are implemented as an integrated circuit.

In a further feature, a cellular phone is provided that includes a first wireless transceiver that receives radio frequency (RF) signals. The RF signals include frequency modulated (FM) signals that have been tuned by a remote device. An FM processing module receives the RF signals, converts the RF signals to baseband signals, and generates processed FM signals.

In another feature, the cellular phone further includes a cellular phone processing module that performs cellular phone signal processing. One or more of the first wireless transceiver and the FM processing module are integrated with the cellular phone processing module in an integrated circuit.

In still another feature, the first wireless transceiver transmits the processed signals to the remote device.

In another feature, the cellular phone further includes a user interface that generates FM station selection data. The first wireless transceiver transmits the FM station selection data to the remote device.

In yet another feature, a system includes the cellular phone and further includes the remote device. The remote device generates an audio signal based on the processed FM signals.

In another feature, a system includes the cellular phone and further includes the remote device. The remote device further includes an antenna and a tuner that communicates with the antenna and that tunes an RF frequency. In another feature, the remote device further includes an amplifier that amplifies signals at the tuned RF frequency. In another feature, the remote device further includes a second wireless transceiver that transmits the IF signals to the cellular phone.

In an additional feature, the first wireless transceiver and the FM processing module are implemented as an integrated circuit.

In another feature, the FM processing module includes an intermediate frequency (IF) mixer that converts the RF signals to IF signals. A BB mixer converts the IF signals to BB signals.

In yet another feature, a communication method is provided that includes receiving radio frequency (RF) signals. The RF signals include frequency modulated (FM) signals that have been tuned by a remote device via a first wireless transceiver. The RF signals are received. The RF signals are converted to baseband signals. Processed FM signals are generated via an FM processing module.

In yet another feature, the communication method further includes transmitting the processed signals to the remote device. In another feature, the communication method further includes generating and transmitting FM station selection data to the remote device.

In another feature, the communication method further includes generating an audio signal based on the processed FM signals. In another feature, the communication method further includes communicating with an antenna and tuning an RF frequency. In still another feature, the communication method further includes amplifying signals at the tuned RF frequency. In another feature, the communication method further includes transmitting the IF signals to the cellular phone.

In an additional feature, the communication method further includes converting the RF signals to IF signals. The IF signals are converted to BB signals.

In another feature, a cellular phone is provided and includes first wireless transceiver means for receiving radio frequency (RF) signals. The RF signals include frequency modulated (FM) signals that have been tuned by a remote device. FM processing means for receiving the RF signals is included. The FM processing means converts the RF signals to baseband signals and generates processed FM signals.

In a further feature, the cellular phone further includes cellular phone processing means for performing cellular phone signal processing. One or more of the first wireless transceiver means and the FM processing means are integrated with the cellular phone processing means in an integrated circuit.

In another feature, the first wireless transceiver means transmits the processed signals to the remote device.

In yet another feature, the cellular phone further includes user interface means for generating FM station selection data. The first wireless transceiver means transmits the FM station selection data to the remote device.

In another feature, a system includes the cellular phone and further includes the remote device. The remote device generates an audio signal based on the processed FM signals.

In still another feature, a system includes the cellular phone and further includes the remote device. The remote device further includes antenna means and tuner means for communicating with the antenna means and for tuning an RF frequency. In another feature, the remote device further includes an amplifier means for amplifying signals at the tuned RF frequency. In another feature, the remote device further includes a second wireless transceiver means that transmits the IF signals to the cellular phone.

In another feature, the first wireless transceiver means and the FM processing means are implemented as an integrated circuit.

In a further feature, the FM processing means includes intermediate frequency (IF) mixer means for converting the RF signals to IF signals. BB mixer means for converting the IF signals to BB signals is also included.

In another feature, a cellular phone is provided and includes a first wireless transceiver that receives baseband (BB) signals. The BB signals are based on frequency modulated (FM) signals that have been tuned and down-converted from a radio frequency (RF) to the BB by a remote device. An FM processing module receives the BB signals and generates processed FM signals based on the BB signals.

In still another feature, the cellular phone further includes a cellular phone processing module that performs cellular phone signal processing. One or more of the first wireless transceiver and the FM processing module are integrated with the cellular phone processing module in an integrated circuit.

In another feature, the first wireless transceiver transmits the processed FM signals to the remote device.

In yet another feature, the cellular phone further includes a user interface that generates FM station selection data. The first wireless transceiver transmits the FM station selection data to the remote device.

In another feature, a system includes the cellular phone and further includes the remote device. The remote device further generates an audio signal based on the processed FM signals.

In an additional feature, a system includes the cellular phone and further includes the remote device. The remote device further includes an antenna and a tuner that communicates with the antenna and that tunes an RF frequency. In another feature, the remote device further includes an amplifier that amplifies RF signals at the tuned RF frequency. In another feature, the remote device further includes an intermediate frequency (IF) mixer that mixes the RF signals to IF signals. In yet another feature, the remote device further includes a BB mixer that mixes the IF signals to BB signals. In another feature, the remote device further includes a second wireless transceiver that transmits the BB signals to the cellular phone.

In another feature, the first wireless transceiver and the FM processing module is implemented as an integrated circuit.

In a further feature, a communication method is provided and includes receiving baseband (BB) signals, which are based on frequency modulated (FM) signals that have been tuned and down-converted from a radio frequency (RF) to the BB by a remote device via a first wireless transceiver. The BB signals are received via an FM processing module. Processed FM signals are generated based on the BB signals.

In another feature, the communication method further includes transmitting the processed FM signals to the remote device.

In still another feature, the communication method further includes generating FM station selection data and transmitting the FM station selection data to the remote device.

In another feature, the communication method further includes generating an audio signal based on the processed FM signals.

In an additional feature, the communication method further includes communicating with an antenna via a tuner and tunings an RF frequency. In another feature, the communication method further includes amplifying RF signals at the tuned RF frequency. In yet another feature, the communication method further includes mixing the RF signals to generate IF signals. In another feature, the communication method further includes mixing the IF signals to generate BB signals. In another feature, the communication method further includes transmitting the BB signals to a cellular phone.

In still another feature, a cellular phone is provided and includes first wireless transceiver means for receiving baseband (BB) signals. The BB signals are based on frequency modulated (FM) signals that have been tuned and down-converted from a radio frequency (RF) to the BB by a remote device. FM processing means for receiving the BB signals is also included. The FM processing means generates processed FM signals based on the BB signals.

In another feature, the cellular phone further includes cellular phone processing means for performing cellular phone signal processing. One or more of the first wireless transceiver means and the FM processing means is integrated with the cellular phone processing means in an integrated circuit.

In a further feature, the first wireless transceiver means transmits the processed FM signals to the remote device.

In another feature, the cellular phone further includes user interface means for generating FM station selection data. The first wireless transceiver means transmits the FM station selection data to the remote device.

In still another feature, a system includes the cellular phone and further includes the remote device. The remote device further generates an audio signal based on the processed FM signals.

In another feature, a system includes the cellular phone and further includes the remote device. The remote device further includes an antenna and tuner means for communicating with the antenna and for tuning an RF frequency. In another feature, the remote device further includes amplifier means for amplifying RF signals at the tuned RF frequency. In a further feature, the remote device further includes intermediate frequency (IF) mixer means for mixing the RF signals to generate IF signals. In another feature, the remote device further includes a BB mixer means for mixing the IF signals to generate BB signals. In yet another feature, the remote device further includes a second wireless transceiver means for transmitting the BB signals to the cellular phone.

In another feature, the first wireless transceiver means and the FM processing means are implemented as an integrated circuit.

In still another feature, a remote device is provided and includes a frequency modulated (FM) tuner that communicates with an antenna and that tunes an FM frequency. A wireless transceiver transmits wireless signals to a remote cellular phone based on FM signals received at the FM frequency.

In another feature, the first wireless transceiver receives FM tuning data from the remote cellular phone and adjusts the FM tuner based on the FM tuning data.

In another feature, the remote device further includes a first antenna that communicates with the FM tuner and receives the RF signals. A second antenna communicates with the first wireless transceiver and transmits the wireless signals.

In an additional feature, the first wireless transceiver includes a Bluetooth interface.

In another feature, the remote device further includes an amplifier that amplifies signals at the tuned RF frequency. A mixer mixes the signals to the IF signals. The first wireless transceiver transmits the IF signals to the remote cellular phone and receives processed FM signals from the remote cellular phone. An amplifier generates amplified audio signals based on the processed FM signals.

In a further feature, a headset includes the remote device and further includes speakers that output the amplified audio signals. In another feature, the headset further includes a conductor that connects the remote device to the speakers. The antenna extends adjacent to the conductor.

In another feature, an article of clothing includes the remote device and further includes a speaker that outputs the amplified audio signals. In another feature, a system includes the remote device and further includes speakers that output the amplified audio signals. In another feature, the system further includes a conductor that connects the remote device to the speakers. The antenna extends adjacent to the conductor.

In yet another feature, the remote device further includes a first amplifier that amplifies RF signals at the tuned RF frequency. An intermediate frequency (IF) mixer mixes the RF signals to IF signals. A BB mixer mixes the IF signals to BB signals. The wireless transceiver transmits the BB signals to the remote cellular phone and receives processed FM signals from the remote cellular phone. A second amplifier generates amplified audio signals based on the processed FM signals.

In another feature, a headset includes the remote device and further includes speakers that output the amplified audio signals. In another feature, the headset further includes a conductor that connects the remote device to the speakers, wherein the antenna extends adjacent to the conductor.

In still another feature, an article of clothing includes the remote device and further includes a speaker that outputs the amplified audio signals.

In another feature, a system includes the remote device of claim 6 and further includes earbuds that output the amplified audio signals. In another feature, the system further includes a conductor that connects the remote device to the earbuds. The antenna extends adjacent to the conductor.

In another feature, the remote device further includes a tuner that tunes an RF frequency. A first amplifier amplifies signals at the tuned RF frequency. The wireless transceiver transmits the RF signals to the remote cellular phone and receives processed FM signals from the remote cellular phone. A second amplifier generates amplified audio signals based on the processed FM signals.

In yet another feature, a headset includes the remote device further includes speakers that output the amplified audio signals. In another feature, the headset further includes a conductor that connects the remote device to the speakers. The antenna extends adjacent to the conductor.

In another feature, an article of clothing includes the remote device and further includes a speaker that outputs the amplified audio signals. In another feature, a system includes the remote device and further includes earbuds that output the amplified audio signals. In another feature, the system further includes a conductor that connects the remote device to the earbuds. The antenna extends adjacent to the conductor.

In another feature, a communication method is provided and includes communicating with an antenna and tuning an FM frequency via a frequency modulated (FM) tuner. Wireless signals are transmitted to a remote cellular phone based on FM signals received at the FM frequency via a wireless transceiver.

In another feature, the communication method includes receiving FM tuning data from the remote cellular phone and adjusting the FM tuner based on the FM tuning data.

In still another feature, the communication method further includes communicating with the FM tuner and receiving the RF signals via a first antenna. The first wireless transceiver is communicated with and the wireless signals are transmitted via a second antenna.

In another feature, the communication method further includes amplifying signals at the tuned RF frequency. The amplified signals are mixed to generate the IF signals. The IF signals are transmitted to the remote cellular phone. Processed FM signals are received from the remote cellular phone. The amplified audio signals are generated based on the processed FM signals.

In a further feature, the communication method further includes amplifying RF signals at the tuned RF frequency. The RF signals are mixed to generate IF signals. The IF signals are mixed to generate BB signals. The BB signals are transmitted to the remote cellular phone. Processed FM signals are received from the remote cellular phone. Amplified audio signals are generated based on the processed FM signals.

In another feature, the communication method further includes tuning an RF frequency. Amplifying signals are tuned at the RF frequency. The RF signals are transmitted to the remote cellular phone. Processed FM signals are received from the remote cellular phone. Amplified audio signals are generated based on the processed FM signals.

In another feature, the communication method further includes outputting the amplified audio signals. In another feature, the communication method further includes outputting the amplified audio signals. In another feature, the communication method further includes outputting the amplified audio signals.

In an additional feature, a remote device is provided and includes frequency modulated (FM) tuner means for communicating with an antenna and for tuning an FM frequency. Wireless transceiver means for transmitting wireless signals to a remote cellular phone based on FM signals received at the FM frequency is also included.

In another feature, the first wireless transceiver means receives FM tuning data from the remote cellular phone and adjusts the FM tuner based on the FM tuning data.

In another feature, the remote device further includes first antenna means for communicating with the FM tuner and receiving the RF signals. Second antenna means for communicating with the first wireless transceiver means and transmitting the wireless signals is included.

In another feature, the first wireless transceiver means includes a Bluetooth interface means.

In yet another feature, the remote device further includes amplifier means for amplifying signals at the tuned RF frequency. Mixer means for mixing the signals to generate the IF signals. First wireless transceiver means for transmitting the IF signals to the remote cellular phone and for receiving processed FM signals from the remote cellular phone is included. Amplifier means for generating amplified audio signals based on the processed FM signals is also included.

In another feature, a headset includes the remote device and further includes audio means for outputting the amplified audio signals. In another feature, the headset further includes a conductor means for connecting the remote means to the audio means. The antenna extends adjacent to the conductor means.

In still another feature, an article of clothing includes the remote device and further includes audio means for outputting the amplified audio signals. In another feature, a system includes the remote device and further includes audio means for outputting the amplified audio signals. In another feature, the system further includes conductor means for connecting the remote means to the audio means. The antenna extends adjacent to the conductor means.

In another feature, the remote device further includes first amplifier means for amplifying RF signals at the tuned RF frequency. Intermediate frequency (IF) mixer means for mixing the RF signals to generate IF signals is included. BB mixer means for mixing the IF signals to generate BB signals is also included. The wireless transceiver means transmits the BB signals to the remote cellular phone and receives processed FM signals from the remote cellular phone. Second amplifier means for generating amplified audio signals based on the processed FM signals is further included.

In another feature, a headset includes the remote device and further includes audio means for outputting the amplified audio signals. In another feature, the headset further includes conductor means for connecting the remote means to the audio means. The antenna extends adjacent to the conductor means.

In a further feature, an article of clothing includes the remote means and further includes audio means for outputting the amplified audio signals. In another feature, a system includes the remote means and further includes audio means for outputting the amplified audio signals. In another feature, the system further includes conductor means for connecting the remote means to the audio means. The antenna extends adjacent to the conductor means.

In another feature, the remote device further includes tuner means for tuning an RF frequency. First amplifier means for amplifying signals at the tuned RF frequency is included. The wireless transceiver means transmits the RF signals to the remote cellular phone and receives processed FM signals from the remote cellular phone. Second amplifier means for generating amplified audio signals based on the processed FM signals is further included.

In another feature, a headset includes the remote device and further includes audio means for outputting the amplified audio signals. In another feature, the headset further includes conductor means for connecting the remote device to the audio means. The antenna extends adjacent to the conductor means.

In an additional feature, an article of clothing includes the remote device and further includes audio means for outputting the amplified audio signals. In another feature, a system includes the remote device and further includes audio means for outputting the amplified audio signals. In another feature, the system further includes conductor means for connecting the remote device to the audio means. The antenna extends adjacent to the conductor means.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A is a functional block diagram of a headset according to the present disclosure;

FIG. 3B is a functional block diagram of earbuds according to the present disclosure;

FIGS. 4A and 4B illustrate articles of clothing that incorporate the remote device according to the present disclosure;

DETAILED DESCRIPTION

Figure 1A:
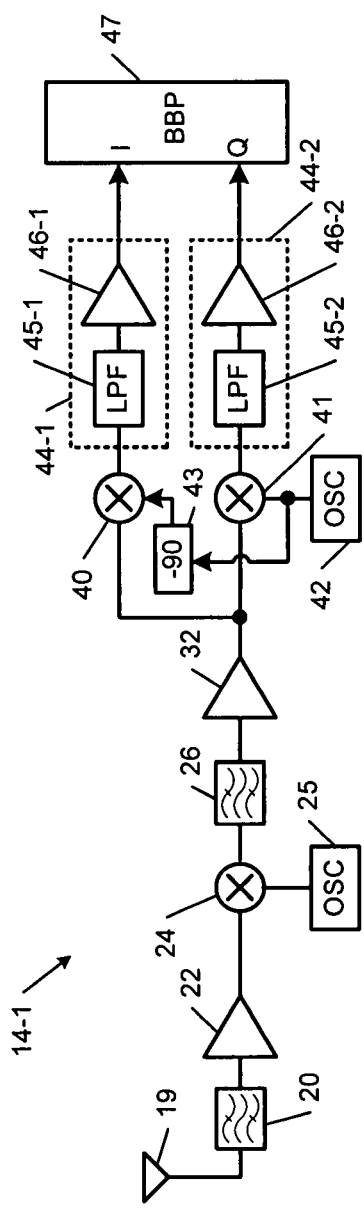
FIG. 1A is a functional block diagram of an exemplary FM receiver according to the prior art.
Figure 1B:
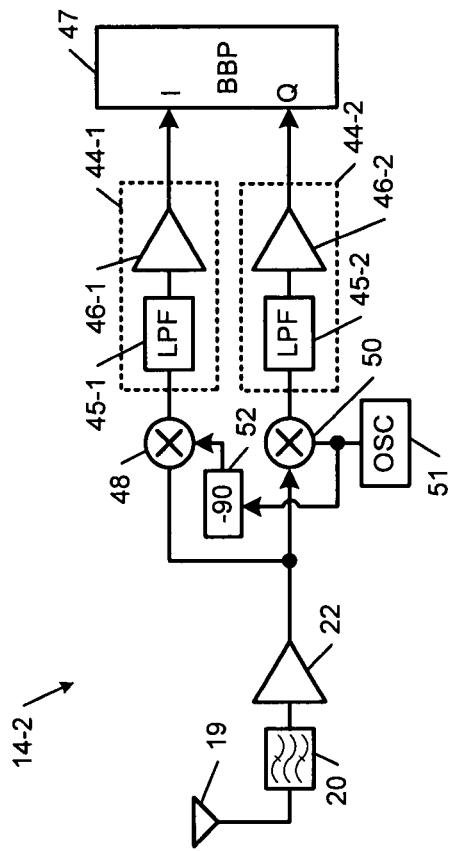
FIG. 1B is a functional block diagram of a second exemplary FM receiver according to the prior art.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed sequentially, simultaneously or in different order without altering the principles of the present disclosure.

A cellular phone FM receiver typically has multiple associated components, such as tuners, low noise amplifiers (LNAs), oscillators, amplifiers, filters, converters, etc. The cellular phone system according to the present invention separates one or more of such components from a cellular phone. As a result, a potion of the FM signal processing is performed remotely from the cellular phone. The cellular phone continues and completes the FM signal processing as described in further detail below.

Figure 2:
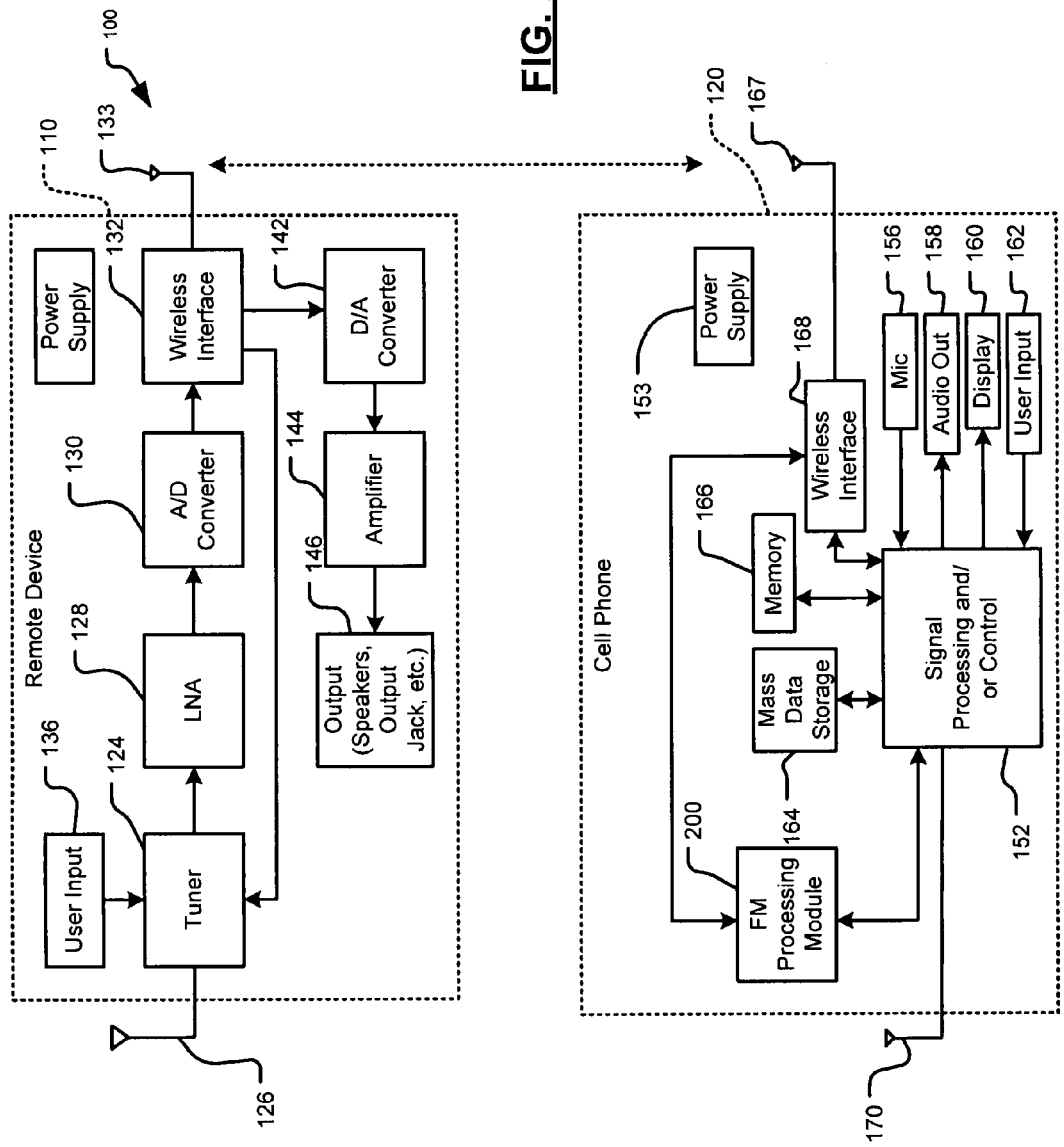
FIG. 2 is a functional block diagram of a cellular phone system including an exemplary remote device and an exemplary cellular phone according to the present disclosure.

Referring now to FIG. 2, a cellular phone system 100 is shown and includes a remote device 110 and a cellular phone 120. The cellular phone system 100, the remote device 110, and the cellular phone 120 are shown as and each considered a cellular phone circuit. The remote device 110 includes a tuning module 124 that tunes to one or more selected frequencies, such as one or more FM radio stations. The tuning module 124 communicates with one or more FM antennas 126 that receive FM signals as input signals. A low noise amplifier (LNA) module 128 amplifies the selected FM signals and outputs amplified signals to an analog to digital (A/D) converter module 130. The A/D converter 130 outputs digital signals to a wireless interface module 132 of the remote device 110. The wireless interface module 132 transmits wireless signals to the cellular phone 120 via an antenna 133. One or more components of the remote device 110 can be integrated into a system on a chip (SOC).

The user may select a particular FM station using inputs on the cellular phone 120 and/or on the remote device 110. If the user employs inputs of the cellular phone 120 to select an FM station, the wireless interface 132 also may receive tuning data such as frequency data from the cellular phone 120, which is output to the tuner 124. Alternately, the remote device 110 may include a user input 136 that allows a user to select a station, adjust volume, and/or perform other radio-based functions such as selecting preset stations, setting preset stations, scanning, etc. The user input of the cellular phone 120 may also allow the user to adjust volume, and/or perform other radio-based functions such as selecting preset stations, setting preset stations, scanning, etc.

The wireless interface 132 also receives the processed FM radio signal from the cellular phone 120. The received signal is output to a digital to analog (D/A) converter 142, which outputs analog audio signals. The D/A converter 142 outputs the audio signal to an amplifier 144, which amplifies the audio signal and outputs the signal to an output 146, such as an output jack, speakers, etc.

An exemplary embodiment of the cellular phone 120 is shown in FIG. 2. Still other types of cellular phones may be used. The cellular phone 120 includes a modified FM receiver or FM processing module 200, which communicates with a wireless interface module 168 of the cellular phone 120. The FM module 200 continues processing of the FM signals as will be described further below. When the processing is completed, the FM module 200 outputs the processed FM signals to the signal processing and/or control module 152 and/or to the wireless interface module 168. From the control module 152, the processed FM signals may be sent to the wireless interface 168 and/or to an audio out 158. The wireless interface module 168, in turn, transmits the wireless signals to the wireless interface module 132 via an antenna 167. The remote device 110 receives the wireless signals and outputs the signals as described above.

The cellular phone 120 in addition to the audio output 158, which may be a speaker and/or audio output jack, may include a microphone 156, a display 160 and/or an input device 162 such as a keypad, pointing device, voice actuation and/or other input device. The control module 152 and/or other circuits (not shown) in the cellular phone 120 may process data, perform coding and/or encryption, perform calculations, format data and/or perform other cellular phone functions. The cellular phone in addition to the antenna 167 may have a cellular designated antenna 170.

The cellular phone 120 may communicate with mass data storage 164 that stores data in a nonvolatile manner such as optical and/or magnetic storage devices for example hard disk drives HDD. The HDD may be a mini HDD that includes one or more platters having a diameter that is smaller than approximately 1.8".

The cellular phone 120 may be connected to memory 166 such as RAM, ROM, low latency nonvolatile memory such as flash memory and/or other suitable electronic data storage. The cellular phone 120 also may support connections with a WLAN via the wireless interface 168 and/or via an additional wireless interface (not shown). The wireless interfaces may be compliant with one or more of the following IEEE standards 802.11, 802.11a, 802.11b, 802.11g, 802.11h, 802.11n, 802.16, 802.20, and/or Bluetooth. The control module 152 may be integrated with the FM module 200, the memory 166 into a system on-chip (SOC).

Referring now to FIG. 3A, the remote device 110 may be packaged with a headset 220, that includes first and second housings 224 and 226. The first and second housings 224 and 226 enclose speakers 230 and 232, respectively. The remote device 110 may be packaged with the first and/or second housings 224 and 226. The housings 224 and 226 may be connected by a "C"-shaped portion 230, which supports the headset 220 on a user's head. The antenna 126 may be routed through the "C"-shaped portion 230. The housings 224 and/or 226 may also house batteries 240, which power the remote device 110.

Referring now to FIG. 3B, the remote device 110 may be integrated with a headset 250, which is shown to include first and second earbuds 244 and 246, respectively. The first and second earbuds 244 and 246 include speakers 230 and 232, respectively. The earbuds 244 and 246 may include a device (not shown) that physically attaches to attach the earbuds 244 and 246 to the user's ears. The remote device 110 may be integrated with one or both of the earbuds 244 and/or 246. The earbuds 244 and 246 may be connected by wire 260. The antenna 126 may be integrated with and/or routed adjacent to the wire 260. The earbuds 244 and/or 246 may also house batteries 240, which power the remote device 110.

Referring now to FIGS. 4A and 4B, the remote device 110 may be attached to and/or inserted in an article of clothing 260. In FIG. 4A, the article of clothing 260 also includes a speaker 270 and a battery 272. In FIG. 4B, the earbuds 244 and 246 are connected by wire 260 to the remote device 110 via an output jack thereof. The antenna 126 may be located adjacent to the wire 260. Still other variations are contemplated.

Figure 5:
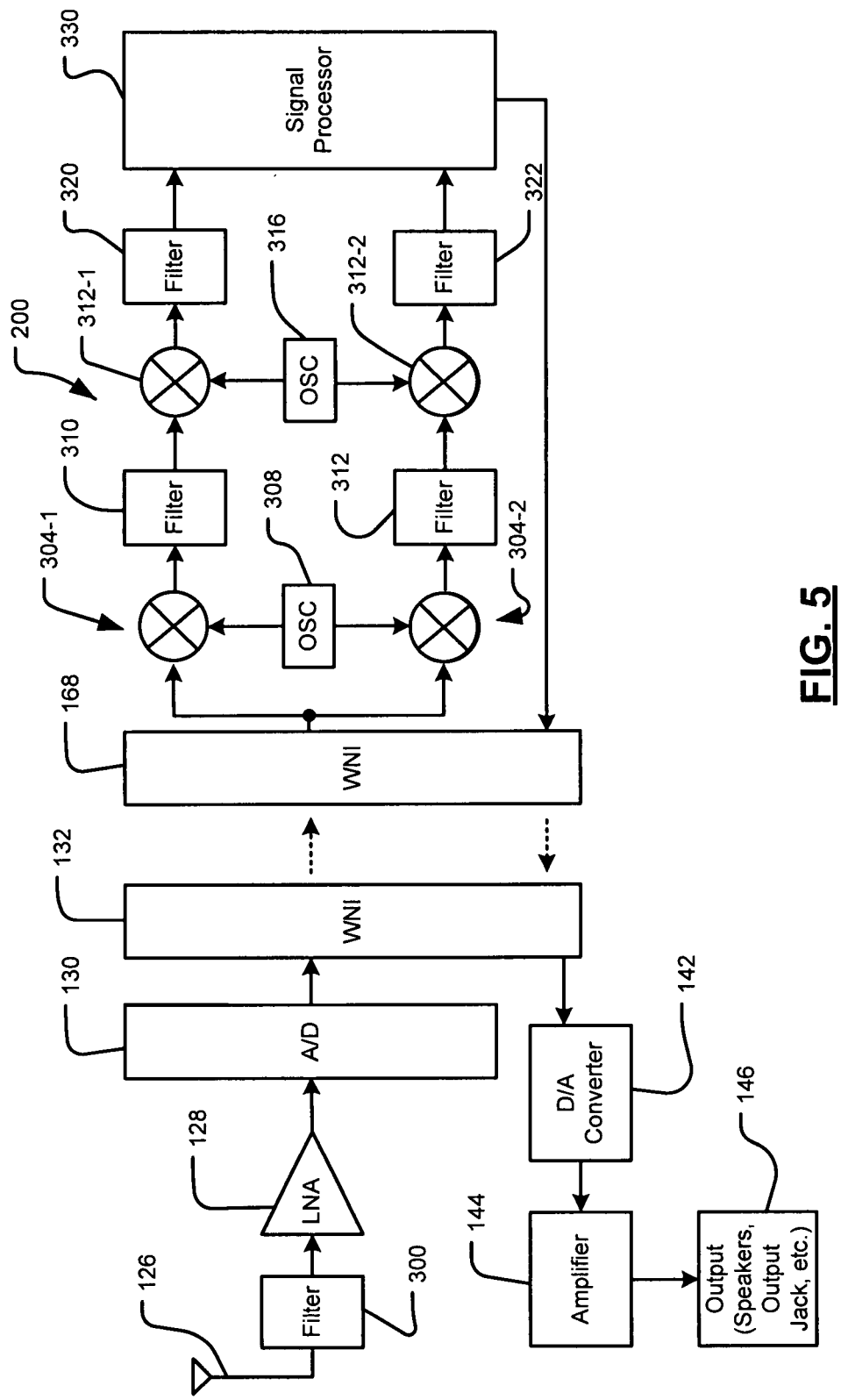
FIG. 5 is a more detailed functional block diagram of the cellular phone system of FIG. 2.
Figure 6:
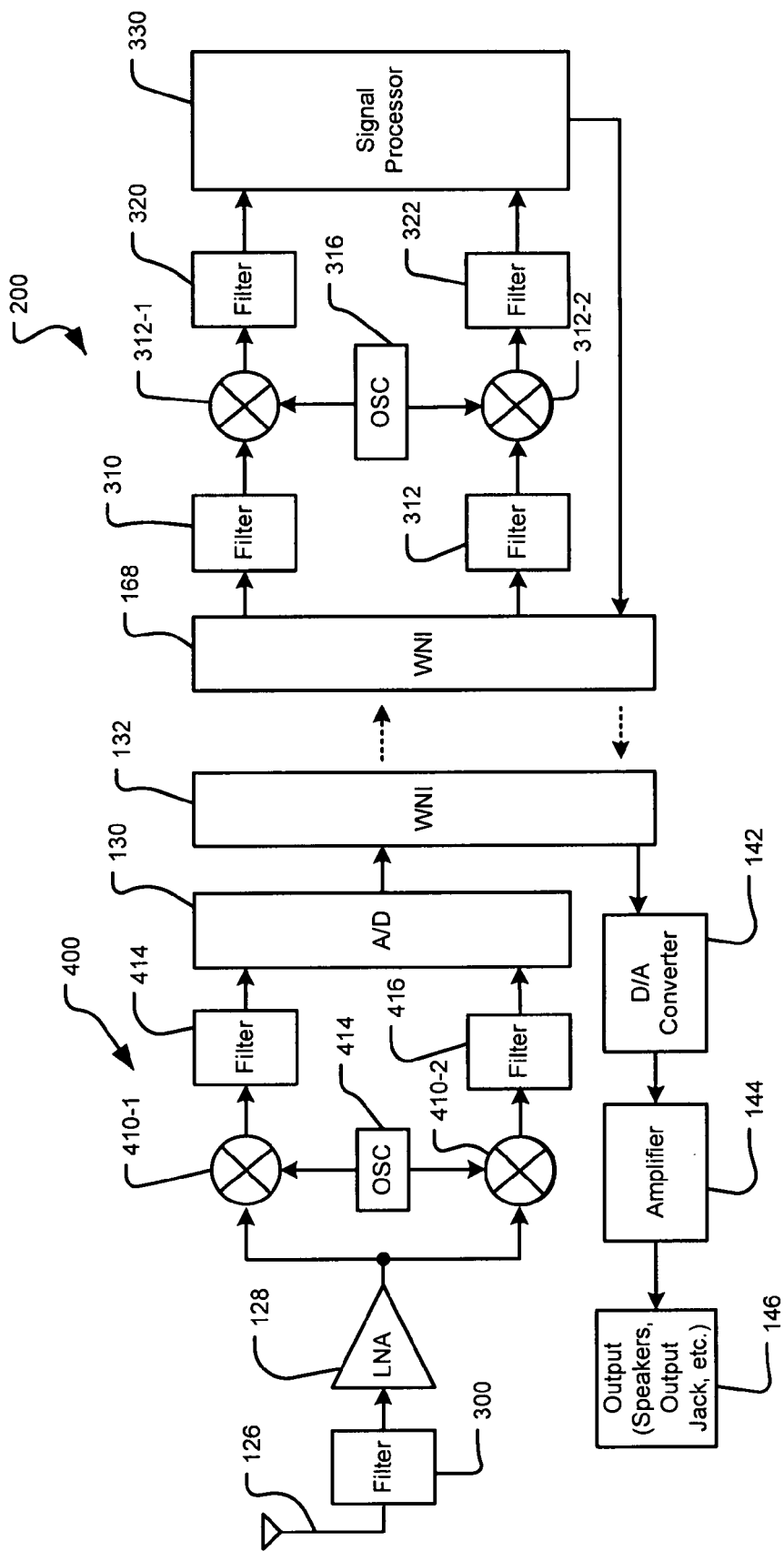
FIG. 6 is a functional block diagram of an alternate cellular phone system.
Figure 7:
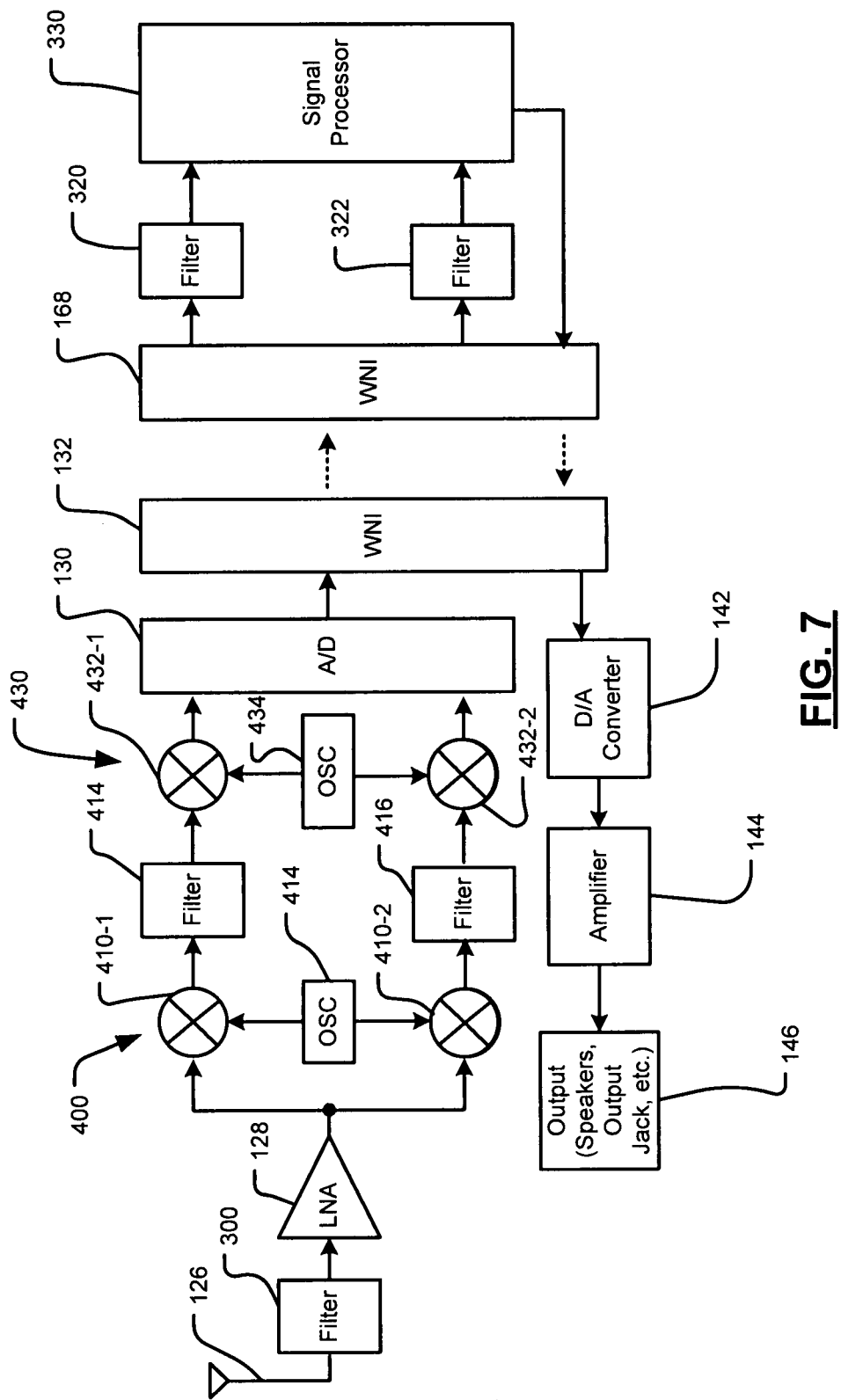
FIG. 7 is a functional block diagram of another alternate cellular phone system.

Referring now to FIGS. 5-7, several variations relating to the relative arrangement and location of FM receiver components associated with the remote device 110 and/or the cellular phone 120 are shown. In FIG. 5, a more detailed drawing of the remote device 110 of FIG. 2 is shown. The LNA is located in the remote device 110. In FIG. 6, an intermediate frequency (IF) mixer is also located in the remote device 110 in addition to the LNA. In FIG. 7, the IF mixer and a baseband (BB) mixer are located in the remote device 110 in addition to the LNA.

In FIG. 5, the antenna 126 receives a RF signal including FM signals. The LNA 128 amplifies the signals and outputs the signals to the A/D converter 130. Optional filters 300 may be used at the input and/or output of the LNA 128. The digital signal output by the A/D converter 130 is output to the wireless network interface 132, which transmits the digital signal to the wireless network interface 168. The wireless network interface 168 outputs the signal to intermediate frequency (IF) mixers 304-1 and 304-2, which also receive a reference signal outputs from an oscillator 308. Intermediate signal outputs of the IF mixers 304-1 and 304-2 are optionally filtered by filters 310 and 312 and input to BB mixers 312-1 and 312-2, respectively. The BB mixers 312-1 and 312-2 also receive reference signal outputs from an oscillator 316. Baseband signal outputs of the BB mixers 312-1 and 312-2 are optionally filtered by filters 320 and 322 and input to a signal processor 330, which processes the baseband FM signals.

The processed FM signals are output by the signal processor 330 to the wireless network interface 168. The wireless network interface 168 transmits the processed signal to the wireless network interface 132. The wireless network interface 132 outputs the received processed signal to a digital to analog (D/A) converter 142. The D/A converter 142 outputs the analog signals to an amplifier 144 as described above.

In FIG. 6, an analog IF mixer 400 is integrated with the remote device 110. The mixer 400 includes first and second mixers 410-1 and 410-2. An analog oscillator 414 outputs oscillator signals to the mixers 410-1 and 410-2. Outputs of the mixers 410-1 and 410-2 are optionally filtered by filters 414 and 416, respectively and output to the A/D converter 130.

In FIG. 7, the analog IF mixer 400 is integrated with the remote device 110. In addition, an analog BB mixer 430 is integrated with the remote device 110. The mixer 430 includes first and second mixers 432-1 and 432-2. An analog oscillator 434 outputs oscillator signals to the mixers 432-1 and 432-2. Outputs of the mixers 432-1 and 432-2 are optionally filtered (not shown) and output to the A/D converter 130. As can be appreciated, one or both of the mixers 400, 430 can be implemented in the digital domain by adjusting the location of the A/D converter 130 in the remote device 110.

Figure 8:
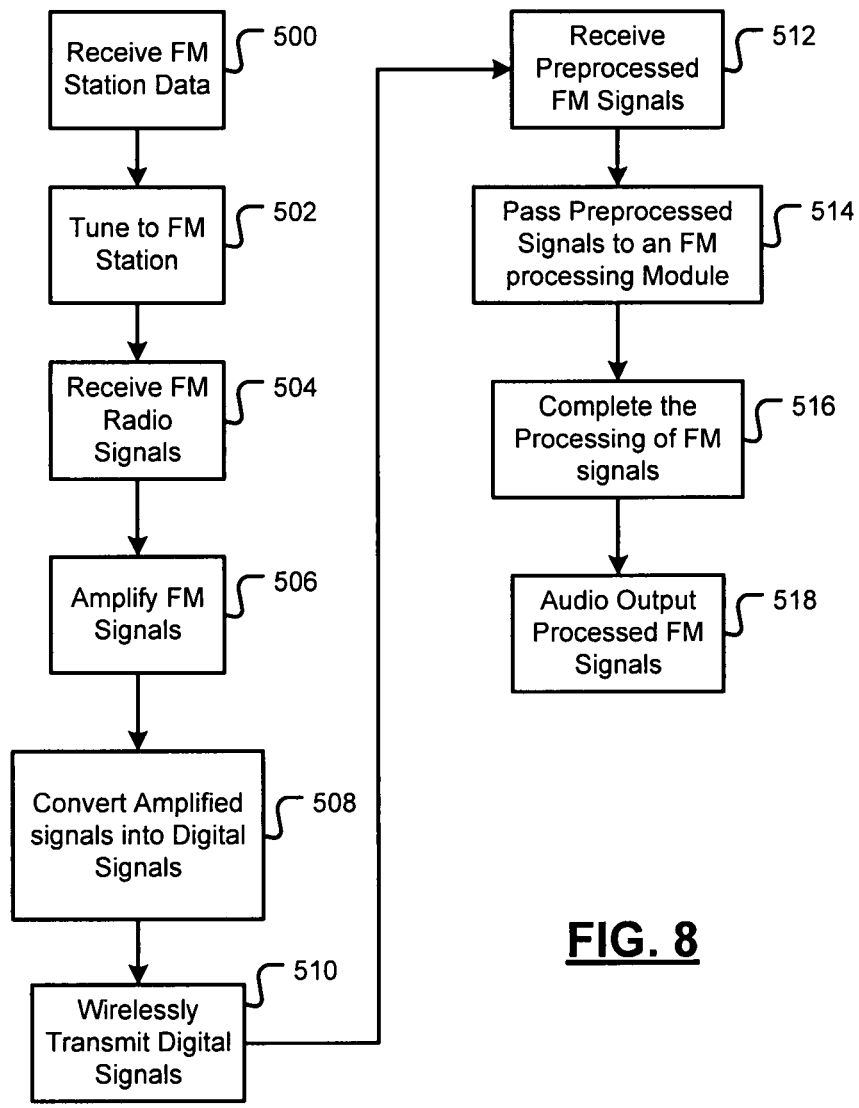
FIG. 8 is a logic flow diagram illustrating a method of operating a cellular phone system.

Referring to FIG. 8, a logic flow diagram illustrating a method of operating a cellular phone system is shown. Although the following steps are primarily described with respect to the embodiment of FIG. 2, the steps may be easily modified to encompass other embodiments of the present invention, some of which are described above.

In step 500, a remote device receives FM station data. The FM station data may be received from a user input of the remote device or may be wirelessly received from a cellular phone using wireless interfaces, such as the interfaces 132, 168. In step 502, a tuner of the remote device tunes to a FM station based on the FM station data. In step 504, FM radio signals are received via a first antenna, such as the antenna 126. In step 506, the FM signals are amplified to generate amplified signals. The FM signals may be amplified by a LNA, such the LNA 128.

In step 508, the amplified signals are converted into digital signals or preprocessed FM signals. The amplified signals may be converter using an A/D converter, such as the A/D converter 130. In step 510, the preprocessed FM signals are wirelessly transmitted as wireless signals to the cellular phone via a second antenna, such as the antenna 133.

Note that additional steps may be incorporated in between steps 504-510 to perform addition FM signal processing as described above and below. For example, additional steps may be incorporated to include the generation of intermediate frequency signals and baseband signals, as well the filtration of such signals.

In step 512, the preprocessed FM signals are received by the cellular phone as input signals via an antenna, such as the antenna 167. In step 514, the preprocessed FM signals are passed through a wireless interface to a FM processing module, such as the FM processing module 200. In step 516, the FM processing module or some other cellular phone processor or control module completes the processing of the originally received FM signals. The preprocessed FM signals are converted into processed FM signals.

In step 518, the processed FM signals from step 116 are transmitted to the remote device for audio output thereof or to an audio output of the cellular phone. Of course, the processed FM signals or data related thereto may be stored in a memory of the cellular phone or in a memory of the remote device.

The above-described method eliminates some of the disadvantages that are associated with the need for a long FM antenna to be directly connected to a cellular phone.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A cellular phone, comprising:
 a first wireless transceiver that receives radio frequency (RF) signals, said RF signals including frequency modulated (FM) signals that have been tuned by a remote device via a user input to a selected frequency associated with said FM signals; and
 an FM processing module that
   receives said RF signals at said selected frequency,
   converts said RF signals to baseband signals, and
   generates processed FM signals,
 wherein said RF signals are transmitted from said remote device and converted to said baseband signals by said cellular phone.

2. The cellular phone of claim 1, further comprising a cellular phone processing module that performs cellular phone signal processing,
 wherein at least one of said first wireless transceiver and said FM processing module is integrated with said cellular phone processing module in an integrated circuit.

3. The cellular phone of claim 1, wherein said first wireless transceiver transmits said processed signals to said remote device.

4. The cellular phone of claim 1, further comprising a user interface that generates FM station selection data,
 wherein said first wireless transceiver transmits said FM station selection data to said remote device.

5. A system comprising:
 the cellular phone of claim 1; and
 said remote device,
 wherein said remote device generates an audio signal based on said processed FM signals.

6. A system comprising:
 the cellular phone of claim 1; and
 said remote device,
 wherein said remote device further comprises:
   an antenna; and
   a tuner that communicates with said antenna and that tunes an RF frequency.

7. The system of claim 6, wherein said remote device further comprises an amplifier that amplifies signals at said tuned RF frequency.

8. The system of claim 7, wherein said remote device further comprises a second wireless transceiver that transmits said IF signals to said cellular phone.

9. The system of claim 6 further comprising a headset, wherein:
 said headset comprises said remote device and further comprises a conductor that connects said remote device to speakers; and
 said antenna extends adjacent to said conductor and between said speakers.

10. The system of claim 6, further comprising:
an amplifier that generates amplified audio signals based on said processed FM signals;
earbuds that output said amplified audio signals; and
a conductor that connects said remote device to said earbuds,
wherein said antenna extends adjacent to said conductor.

11. The cellular phone of claim 1, wherein said first wireless transceiver and said FM processing module are implemented as an integrated circuit.

12. The cellular phone of claim 1, wherein said FM processing module comprises:
an intermediate frequency (IF) mixer that converts said RF signals to IF signals; and
a BB mixer that converts said IF signals to BB signals.

13. The cellular phone of claim 1, wherein said FM processing module receives said RF signals at said selected frequency from said remote device.

14. The cellular phone of claim 1, wherein:
said cellular phone selects a frequency of an FM station and transmits said selected frequency to said remote device;
said remote device generates said RF signals based on said selected frequency; and
said cellular phone generates audio output signals based on said processed FM signals.

15. A communication method comprising:
receiving radio frequency (RF) signals, said RF signals including frequency modulated (FM) signals that have been tuned by a remote device via a first wireless transceiver via a user input to a selected frequency associated with said FM signals; and
receiving said RF signals at said selected frequency;
converting said RF signals to baseband signals; and
generating processed FM signals via an FM processing module,
wherein said RF signals are transmitted from said remote device and converted to said baseband signals by a cellular phone.

16. The communication method of claim 15, further comprising transmitting said processed signals to said remote device.

17. The communication method of claim 15, further comprising generating and transmitting FM station selection data to said remote device.

18. The communication method of claim 15, further comprising generating an audio signal based on said processed FM signals.

19. The communication method of claim 15, further comprising communicating with an antenna and tuning an RF frequency.

20. The communication method of claim 19, further comprising amplifying signals at said tuned RF frequency.

21. The communication method of claim 20, wherein:
said RF signals are transmitted to said cellular phone via a second wireless transceiver of said remote device; and
said RF signals are received via said first wireless transceiver of said cellular phone.

22. The communication method of claim 15, further comprising:
converting said RF signals to IF signals; and
converting said IF signals to BB signals.

23. A cellular phone, comprising:
first wireless transceiver means for receiving radio frequency (RF) signals, said RF signals including frequency modulated (FM) signals that have been tuned by a remote device via a user input to a selected frequency associated with said FM signals; and
FM processing means for receiving said RF signals at said selected frequency, converting said RF signals to baseband signals, and generating processed FM signals,
wherein said RF signals are transmitted from said remote device and converted to said baseband signals by said cellular phone.

24. The cellular phone of claim 23, further comprising cellular phone processing means for performing cellular phone signal processing,
wherein at least one of said first wireless transceiver means and said FM processing means is integrated with said cellular phone processing means in an integrated circuit.

25. The cellular phone of claim 23, wherein said first wireless transceiver means transmits said processed signals to said remote device.

26. The cellular phone of claim 23, further comprising user interface means for generating FM station selection data,
wherein said first wireless transceiver means transmits said FM station selection data to said remote device.

27. A system comprising:
the cellular phone of claim 23; and
said remote device,
wherein said remote device generates an audio signal based on said processed FM signals.

28. A system comprising:
the cellular phone of claim 23; and
said remote device,
wherein said remote device further comprises:
an antenna; and
tuner means for communicating with said antenna and for tuning an RF frequency.

29. The system of claim 28, wherein said remote device further comprises an amplifier means for amplifying signals at said tuned RF frequency.

30. The system of claim 29, wherein said remote device further comprises a second wireless transceiver means for transmitting said IF signals to said cellular phone.

31. The cellular phone of claim 23, wherein said first wireless transceiver means and said FM processing means are implemented as an integrated circuit.

32. The cellular phone of claim 23, wherein said FM processing means comprises:
intermediate frequency (IF) mixer means for converting said RF signals to IF signals; and
BB mixer means for converting said IF signals to BB signals.

* * * * *